United States Patent
Boydston et al.

(10) Patent No.: US 9,834,929 B2
(45) Date of Patent: Dec. 5, 2017

(54) POLYESTER LAMINATED BUILDING BOARDS WITH IMPROVED SURFACE CHARACTERISTICS

(71) Applicant: Saint-Gobain Placo SAS, Suresnes (FR)

(72) Inventors: Gerald D. Boydston, Cody, WY (US); Bryan J. Wiltzius, Largo, FL (US); Choung-Houng Lai, Acton, MA (US); Michael J. Lemberger, Dudley, MA (US)

(73) Assignee: Saint-Gobain Placo SAS, Suresnes (FR)

( * ) Notice: Subject to any disclaimer, the term of this patent is extended or adjusted under 35 U.S.C. 154(b) by 591 days.

(21) Appl. No.: 14/153,260

(22) Filed: Jan. 13, 2014

(65) Prior Publication Data
US 2015/0197938 A1  Jul. 16, 2015

(51) Int. Cl.
E04C 2/04 (2006.01)

(52) U.S. Cl.
CPC ....... E04C 2/043 (2013.01); *Y10T 428/24331* (2015.01); *Y10T 442/665* (2015.04); *Y10T 442/675* (2015.04)

(58) Field of Classification Search
CPC .............. Y10T 428/24331; E04C 2/043
See application file for complete search history.

(56) References Cited

U.S. PATENT DOCUMENTS

| | | | |
|---|---|---|---|
| 4,233,368 A | 11/1980 | Baehr et al. | |
| 4,242,406 A | 12/1980 | Bouhnini et al. | |
| 5,565,252 A | 10/1996 | Finestone et al. | |
| 5,573,829 A | 11/1996 | Decker | |
| 7,763,134 B1* | 7/2010 | Kumar | B32B 13/12 156/39 |
| 2004/0038065 A1 | 2/2004 | Francis et al. | |
| 2004/0103608 A1 | 6/2004 | Lionel | |
| 2009/0042471 A1 | 2/2009 | Cashin et al. | |
| 2009/0123727 A1* | 5/2009 | Martin | B28B 19/0092 428/294.7 |
| 2009/0123767 A1 | 5/2009 | Gohil et al. | |
| 2010/0139528 A1 | 6/2010 | Yu et al. | |

FOREIGN PATENT DOCUMENTS

| | | |
|---|---|---|
| EP | 2154305 A2 | 2/2010 |
| WO | 200109445 A2 | 2/2001 |
| WO | 2004045848 A1 | 6/2004 |

* cited by examiner

*Primary Examiner* — William P Watkins, III
(74) *Attorney, Agent, or Firm* — GrayRobinson, P.A.; Michael J. Colitz, III; Christopher M. Ramsey

(57) ABSTRACT

This disclosure relates to using polyester films on building boards to enable improved surface coatings. The polyester film is preferably applied to a glass mat via an adhesive to form a laminate. This laminate is then bonded to the exterior surface of a gypsum board. The polyester film is advantageous because it allows for exterior surface coatings to be applied. In one embodiment, an exterior acrylic coating is applied to the polyester film. Boards constructed in accordance with this disclosure allow for exterior finishings to be achieved without the need for excessive finishing materials or steps.

4 Claims, 6 Drawing Sheets

POLYESTER LAMINATED BUILDING BOARDS WITH IMPROVED SURFACE CHARACTERISTICS

TECHNICAL FIELD

This disclosure relates to the use of polyester laminates in building boards. More particularly, the present disclosure relates to using polyester laminates to improve the surface characteristics of building boards.

BACKGROUND OF THE INVENTION

For over a century, wallboard has been used as an interior wall covering. The most common type of wallboard is gypsum wallboard. The basic construction includes a core of cementitious gypsum that is positioned between two opposing paper liners. One of the paper liners forms the exterior wall finishing. An example of a paper-covered gypsum board is illustrated in U.S. Pat. No. 2,806,811 to Von Hazmburg. Von Hazmburg discloses a board that primarily consists of a thick gypsum core that is encased in a fibrous envelope consisting of both a manila sheet and a newsprint sheet. These sheet layers can be made from a conventional multi-cylinder paper making process.

It is also known to replace the paper facing sheets with opposing glass fiber mats. This construction is referred to as glass reinforced gypsum boards (or "GRG"). A GRG board is disclosed in U.S. Pat. No. 4,265,979 to Baehr et. al. A further improvement was realized by slightly embedding one or more of the glass fiber mats into the core slurry of the board during the manufacturing process. This results in a thin film of slurry being formed on the outer surface of the board. Building boards with this construction are referred to as embedded glass reinforced gypsum (EGRG) boards. EGRG boards eliminate, or greatly reduce, the presence of exposed fibers.

Yet, paper faced boards, GRG boards, and EGRG boards, all require extensive finishing materials and labor intensive steps in order to achieve a desirable exterior wall finishing. According to the Gypsum Association, wall finishings are measured on a scale ranging from the least smooth (Level 0) to the most smooth (Level 5). A level 0, the exterior surface of the board is rough and or textured in appearance. Contortions and undulations are easily visible upon the board. At Level 5, the exterior surface of the board has a very smooth appearance that approximates glass.

Paper faced gypsum board is not capable of yielding a Level 5 finish without the incorporation of special sealers and multiple skim coats of a finishing compound. Sanding is also required as each level is built up. Hence, achieving a Level 5 finish with paper faced boards is a labor intensive process that requires a variety of added materials.

Forming a Level 5 finish on GRG or EGRG boards can prove equally problematic albeit for different reasons. GRG and EGRG boards have a cementitious surface and/or core that is filled with desiccant-like materials. Thus, when finishing compounds are added to the surface of these boards, they are quickly absorbed. To be effective, large volumes of finishing compounds must be used. The absorption of the finishing compounds can also cause voids, cracking, premature desaturation and resultant quick set. All of these precludes the formation of a Level 5 finish on GRG or EGRG boards.

Various efforts have been made over the years to reduce the materials, labor, and time needed to adequately finish the exterior surface wall boards. For example, sprayable compounds have been developed to provide wall boards with Level 4 or Level 5 finishes. Yet, these sprayable compounds suffer from all of the aforementioned drawbacks. Paper faced boards do not saturate quickly enough. As a result, sprayable finishes run when applied to paper faced boards. By contrast, glass reinforced boards absorb liquids too quickly. As a result, unnecessarily large volumes of spray must be used in order to achieve a desired finish. These problems can only be overcome by using skim coatings or specialized primers, which only adds to the time and expense of the finishing effort.

The composite building boards of the present disclosure are designed to overcome these drawbacks by utilizing a polyester film to achieve a smooth exterior finish with minimal finishing materials, time or expense.

SUMMARY OF THE INVENTION

This disclosure permits smooth exterior finishes to be applied to wall boards with minimal finishing materials, time, and expense.

One advantage of the present disclosure is realized by utilizing a polyester laminate to produce a wall board having a smooth exterior finish.

Yet another advantage is attained by employing a polyester laminate as the base for an exterior acrylic coating, which itself provides a satisfactory surface.

Still yet another advantage is achieved by adhering a polyester film to a fibrous mat via a hot melt adhesive, thereby producing a laminate that can facilitate the formation of smooth exterior surface.

Another advantage is reached by adhering an acrylic lined polyester film to a fibrous mat via a hot melt adhesive, thereby producing a laminate that provides a smooth exterior surface.

A further advantage is realized by using a perforated polyester film in the creating of a building board with a desirable surface finishing.

The building boards of the present disclosure enable the formation of Level 5 finishes without the need for extra finishing materials and while minimizing time, labor, and expense.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference characters refer to similar components throughout the several views of the drawings.

DETAILED DESCRIPTION OF THE DRAWINGS

The present disclosure relates to the use of polyester films to facilitate improved surface finishings for building boards. The polyester film is preferably applied to a glass mat via an adhesive to form a mat/film laminate. The laminate is subsequently bonded to the surface of a gypsum board. The polyester film is advantageous because it allows for exterior surface coatings to be applied. In one embodiment, an exterior acrylic coating is applied to the polyester film. Boards constructed in accordance with this disclosure allow for exterior finishings to be achieved without the need for excessive finishing materials or steps.

Figure 1:
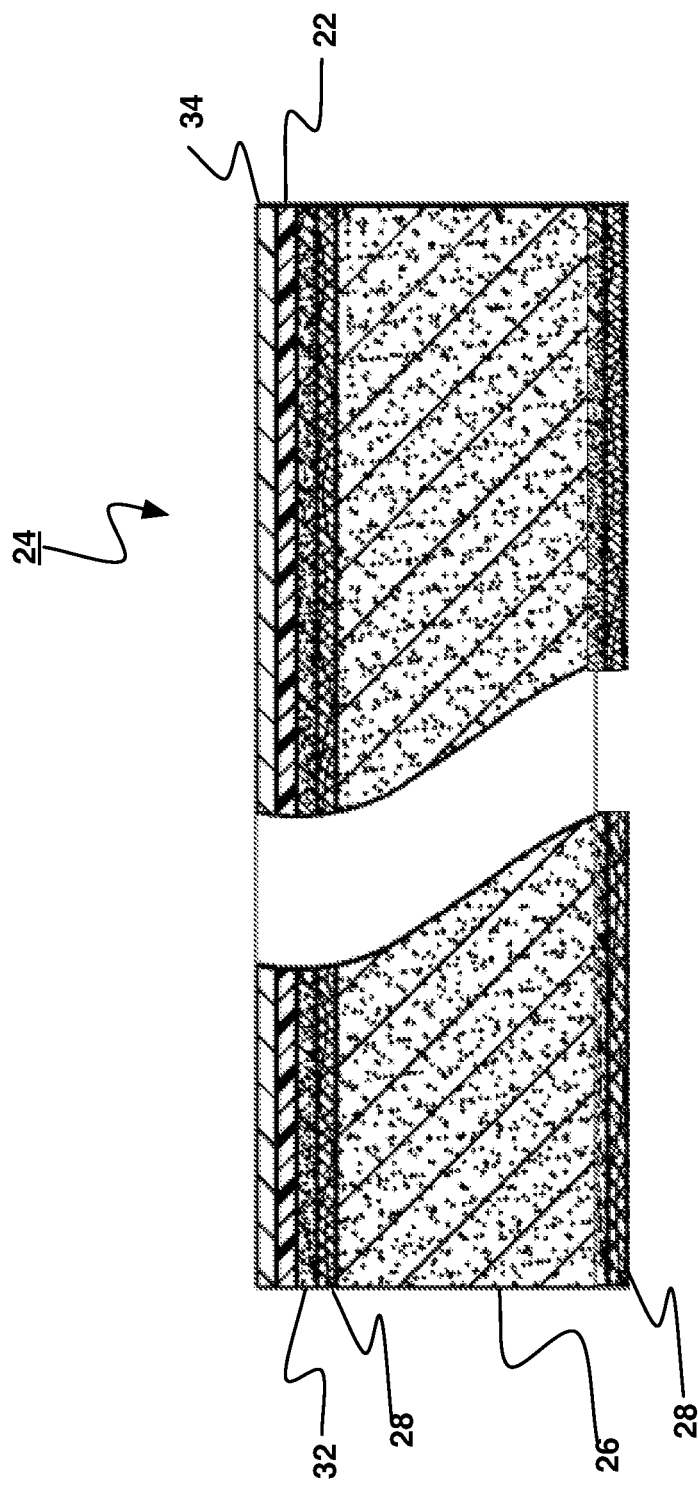
FIG. 1 is a cross sectional view of a building board made in accordance with the present disclosure.

With reference to FIG. 1, polyester film 22 forms one layer of to a composite, multi-layered building panel 24. Panel 24 can be formed from opposing paper sheets with an interior gypsum core 26. In another embodiment, opposing fibrous mats 28 are used in lieu of paper sheets. Fibrous mats 28 are formed from randomly aligned organic or inorganic fibers that are held together with a binder. As with conventional EGRG boards, mats 28 are porous to allow mat 28 to be slightly embedded in the gypsum core 26 during assembly.

Core 26 is formed from a set, crystalline gypsum matrix that extends fully between, and is bonded to, the interior surfaces of the upper and lower fiber mats 28. In one specific but non-limiting example, the portion of core 26 proximate upper and lower fiber mats 28 has a density that is greater than the density of the remainder of core 26. In other words, the inner most extent of core 26 is less dense than the upper and lower peripheries. This helps strengthen the face of the board without unduly increasing the overall board weight.

In the preferred embodiment, polyester film 22 is formed from polyethylene terephthalate (PET). However, the use of other polyester films is also within the scope of the present invention. It is also within the scope of the present invention to employ polymer films such as, but not limited to, polyethylene, polypropylene, polystyrene, polyurethane, polyvinyl acetate, or polyvinyl alcohol films. The interior surface of film 22 can be modified to improve its ability to adhere to lower layers and to promote the formation of a laminate. For example, the interior surface can be modified via corona or flame treatments.

An adhesive 32 is employed in adhering polyester film 22 to the exterior surface of the upper mat 28. The preferred adhesive is a hot melt polymer adhesive. The adhesive may be heat activated. Other polymer based resins can likewise be used. The adhesive composition may include additives for ultraviolet (UV) resistance, antimicrobial resistance, or other additives to promote adhesion. A nip or roller can be used to activate adhesive 32 and thereby join film 22 to the exterior surface of the upper mat 28. This step can be carried out prior to, and separate from, the other steps needed to produce the final composite board 24. Alternatively, film 22 and mat 28 can be joined together at a point along the board forming station 44 (note FIG. 2). Upper mat 28 with the adhered polyester film 22 together form a laminate sheet 42. Adhesive 32 forms an outer stratum on fibrous mat 28 that is smooth and that is substantially free of the fibers that make up mat 28. As a result, film 22 produces a smooth outer application surface that is level in appearance. Film 22, thereby, presents an excellent surface for subsequent finishing materials, such as acrylics or similar materials. In practice, the exterior surface of film 22 may consist of minor topographical inconsistencies ranging from a minimum depth of 0.001 inches to a maximum of about 0.01 inches. In one possible alternative, film 22 can have an adhesive applied to both of its outer surfaces such that film 22 can be bonded to multiple different layers.

A finish coating 34 is thereafter applied to the exposed surface of film 22. In the preferred embodiment, finish coating 34 is an acrylic. Acrylic coating 34 is applied to the surface of the polyester film 22 to give board 24 a smooth exterior surface finish. Acrylic coating 34 also beneficial because it provides paint adhesion and a matte finish. In an alternative embodiment, the acrylic coating 34 may be adhered to the film 22 and mat 28 prior to laminate being delivered to the board forming line 44.

Perforations can be formed in film 22 and/or in mat 28 to avoid blistering during the subsequent drying of board 24. This can be accomplished by perforating film 22 prior to it being adhered to mat 28. Alternatively, the mat 28 and film 22 can be perforated together after formation of the laminate. In either case, the perforations allow for the transmission of vapor, including but not limited to water vapor, during the subsequent drying of composite board 24. More specifically, as the board passes through one or more driers, water vapor is liberated from the partially or fully hydrated gypsum. Without the perforations, the water vapor that is driven out of the core 26 may cause blistering or deformation of the upper paper or fibrous mat.

Figure 2:
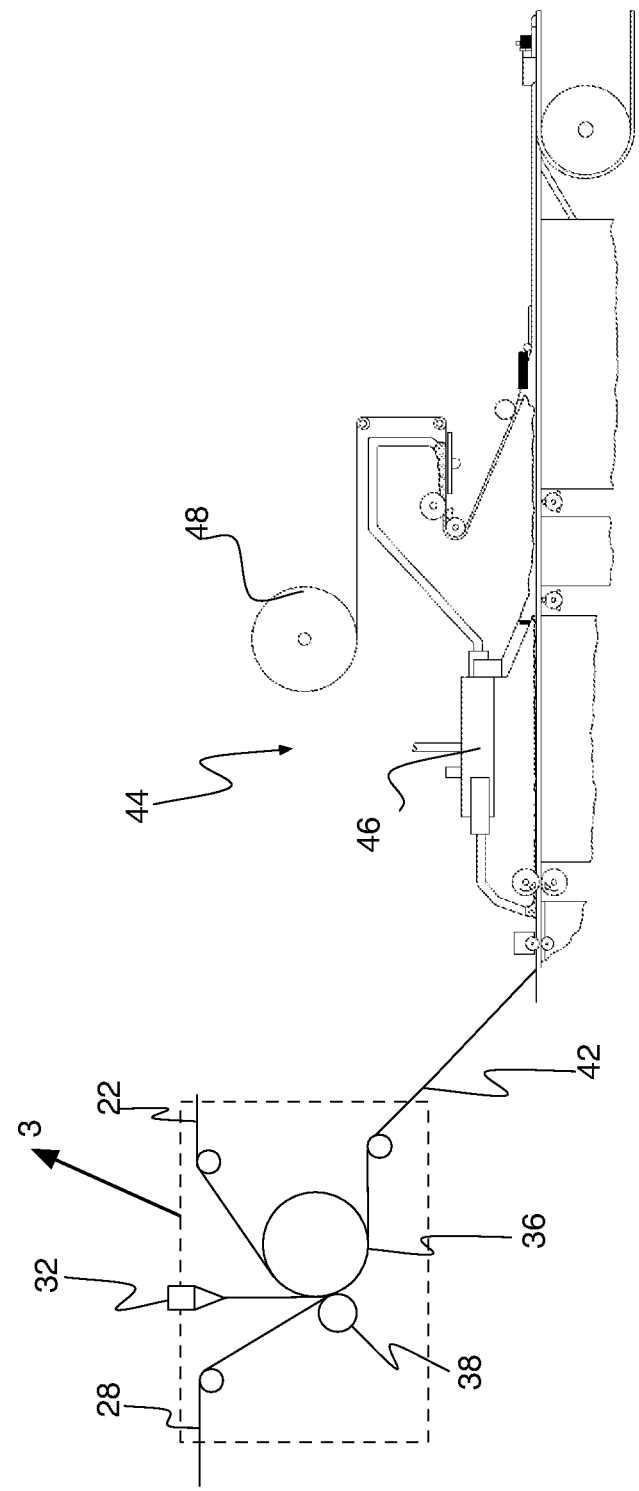
FIG. 2 is a side elevational view of a production line for producing building boards in accordance with the present disclosure.
Figure 3:
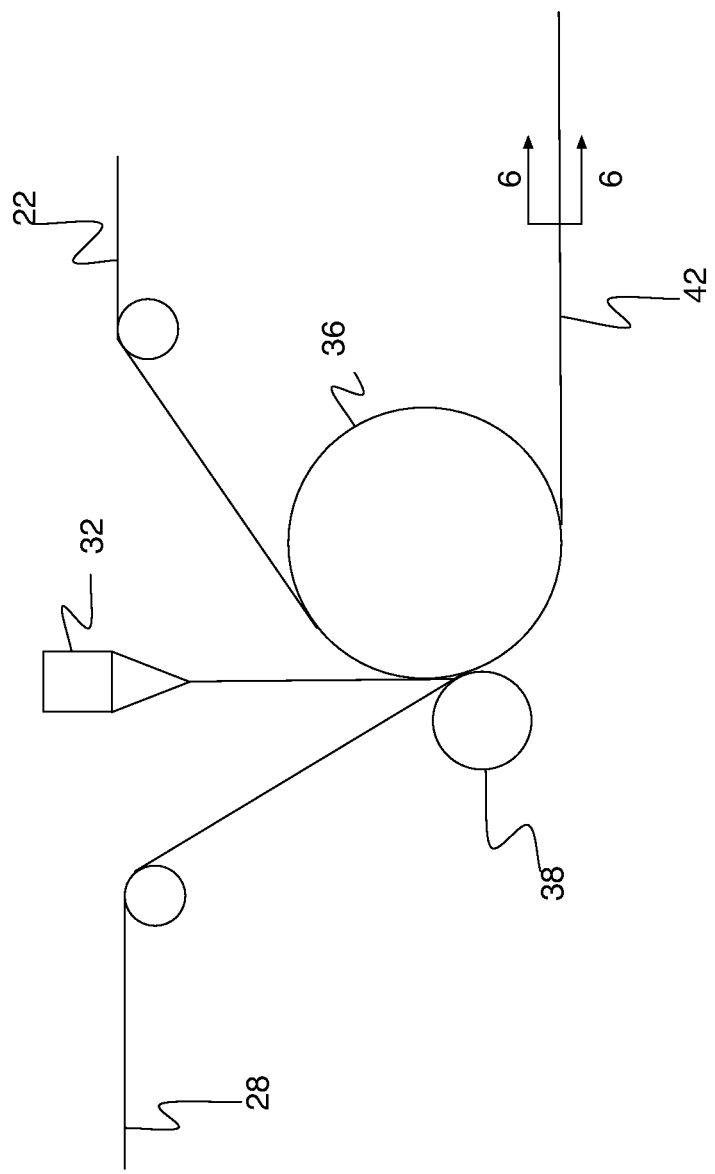
FIG. 3 is detailed view of the production line taken from FIG. 2.
Figure 6:
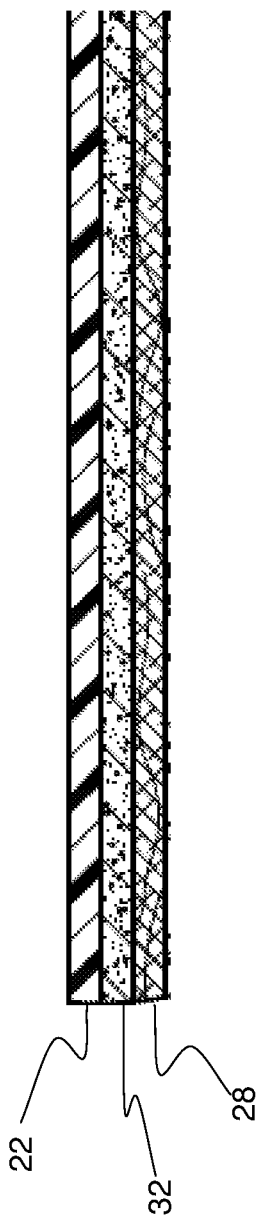
FIG. 6 is a sectional view taken from Line 6-6 of FIG. 3.

FIG. 2 illustrates one possible manufacturing process for producing building board in accordance with the present disclosure. Mat 28 is unwound from a supply roll (not shown) and brought into contact with film 22. Mat 28 and film 22 are brought together between a nip roll 38 and a chill roll 36. A die supplies adhesive 32 to the nip as the mat 28 and film 22 are brought together. Adhesive 32 bonds film 22 to an exterior surface of mat 28. Together mat 28 and film 22 form a laminate 42 that is subsequently delivered to production line 44. Gypsum slurry is then supplied to the surface of the mat 28 that is opposite the adhered film 22. The gypsum slurry is delivered from a mixer 46. The film/mat laminate 42 is preferably embedded into the deposited slurry. Vibrators can be included to ensure a sufficient degree of penetration. The degree of penetration can range from 0.5% to 101%. Namely, the deposited slurry can penetrate between 0.5% to 101% of thickness of the laminate 42. An additional supply of a fibrous mat 28 can be delivered from supply roll 48 to form the opposite side of the building board. FIG. 3 is a more detailed view of the nip roll 38 and chill roll 36. The cross section of FIG. 6 also shows the resulting laminate 42. Specifically, laminate 42 is formed from fibrous mat 28, adhesive 32 and film 22.

It is within the scope of the present disclosure to apply both adhesive 32 and film 22 in liquefied form as a co-extrusion. Film 22 can be applied to mat 28 prior to arriving at the production line 44. Alternatively, as depicted in FIG. 2, film 22 and mat 28 can be adhered as part of a single manufacturing process. Film 22 can similarly be adhered at a point downstream of the production line 44. For instance, film 22 can be applied pre or post dryer. Film 22 can be chemically pre-conditioned to chemically bond with compounds, softening agents, acids, alkalizers, waxes, or combinations thereof, within adhesive 32. This chemical bonding improves the mechanical and/or chemical adhesion between the film and adhesive 32.

Figure 4:
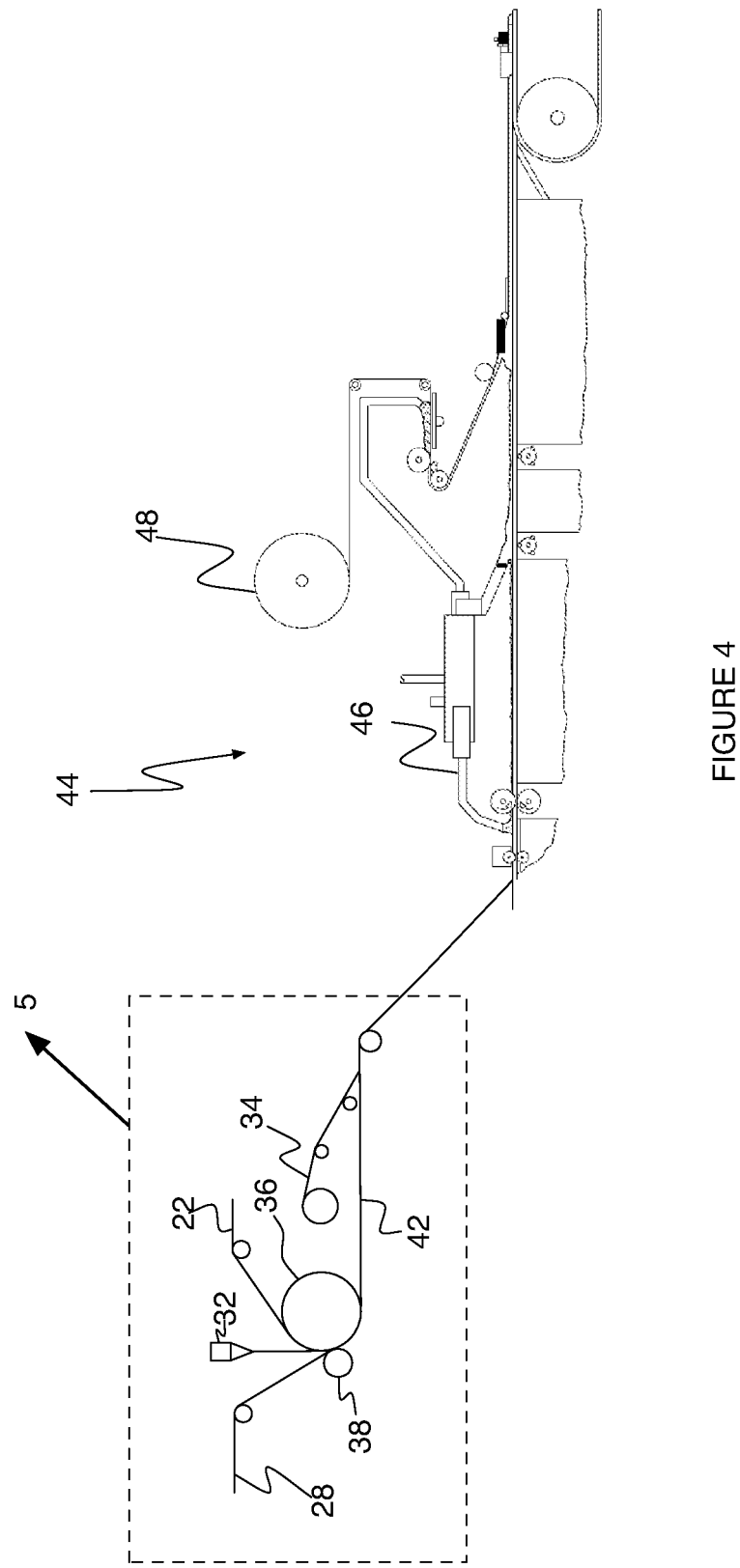
FIG. 4 is a side elevational view of an alternative production line for producing building boards in accordance with the present disclosure.
Figure 5:
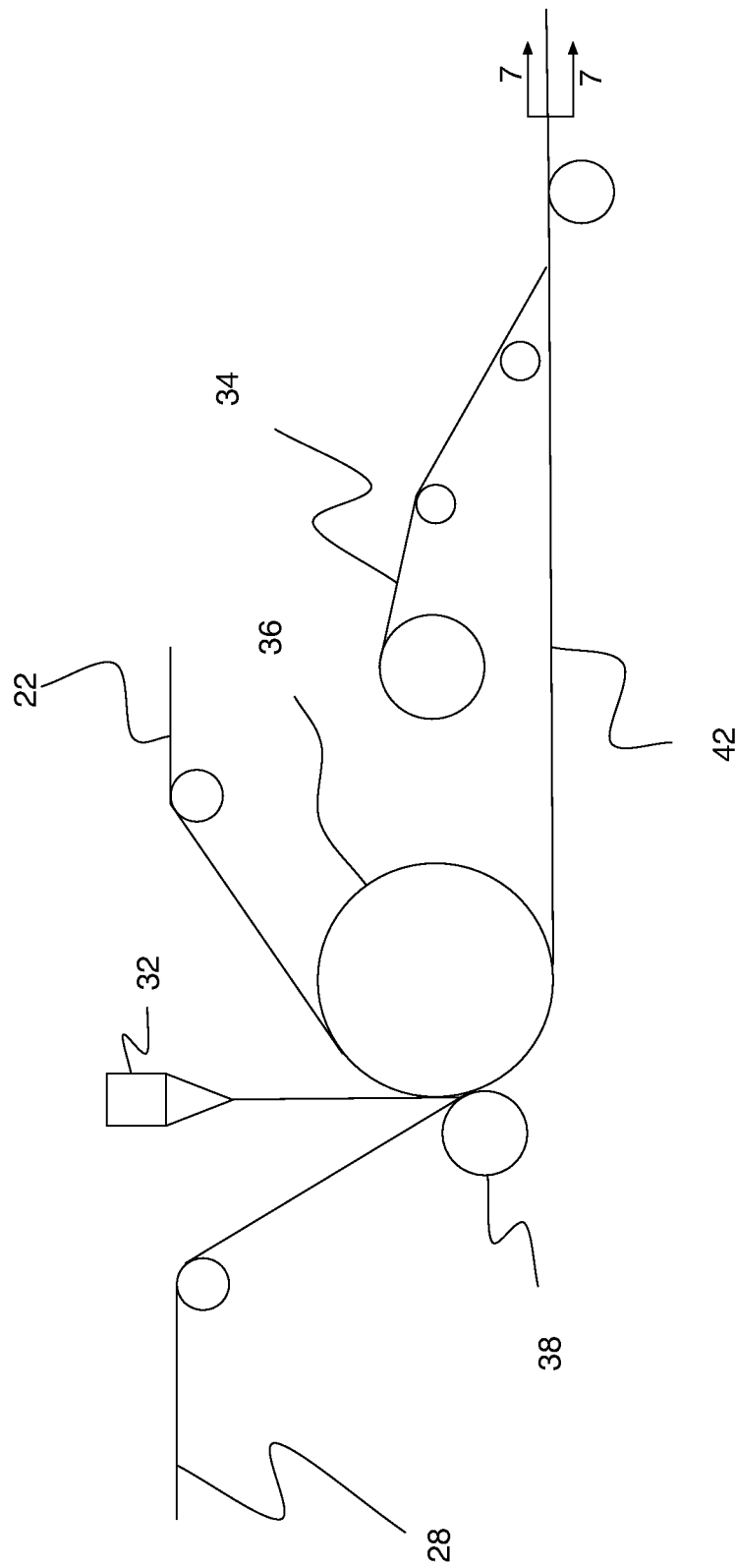
FIG. 5 Is a detailed view of the production line taken from FIG. 4.
Figure 7:
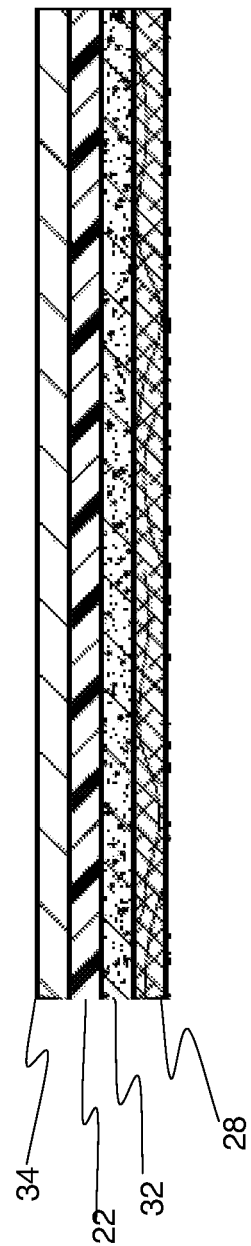
FIG. 7 is a sectional view taken from Line 7-7 of FIG. 5.

FIGS. 4 and 5 illustrate an alternative manufacturing process. This process is the same in most respects to the above reference process. However, following the formation of the mat 28 and film 22 laminate, an acrylic coating 34 is applied overtop of film 22. FIG. 7 is a cross sectional view of the resulting laminate, which consists of mat 28, adhesive 32, film 22, and acrylic coating 34.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A composite, multi-layered building panel comprising:
    opposed upper and lower fiber mats, the mats being porous and each mat having an interior and an exterior surface;
    a set gypsum core extending between and bonded to the interior surfaces of the upper and lower fiber mats, the portion of the set gypsum core proximate the upper and lower fiber mats having a density that is greater than the remainder of the set gypsum core;
    a polyethylene terephthalate (PET) film having an interior and an exterior surface, the interior surface being modified via a corona treatment to improve bonding;
    a hot melt polymer adhesive adhering the modified interior surface of the PET film to the exterior surface of the upper fiber mat, whereby the PET film is bonded to the upper fiber mat;
    an acrylic coating applied to the exterior surface of the PET film, the acrylic coating providing a surface finish to the composite, multi-layered building panel;
    wherein the hot melt polymer adhesive forms a smooth outer stratum on the upper and lower fiber mats, the outer stratum being substantially free of the fibers that make up the upper and lower fiber mats.

2. The building panel of claim 1, wherein the exterior surface of the PET film includes topological inconsistencies ranging from a depth of about 0.001 inches to about 0.01 inches.

3. The building panel of claim 1, wherein the surface finish is a level 4 or level 5 surface finish.

4. The building panel of claim 1, wherein the surface finish is a paintable matte finish.

* * * * *